Sept. 1, 1964  J. T. SCULLY  3,147,028
CHECK BOOKS
Filed Dec. 12, 1961  2 Sheets-Sheet 1
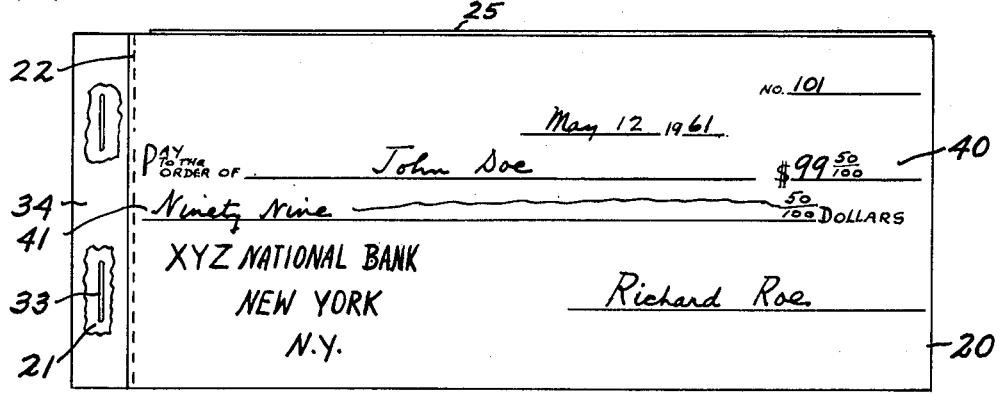
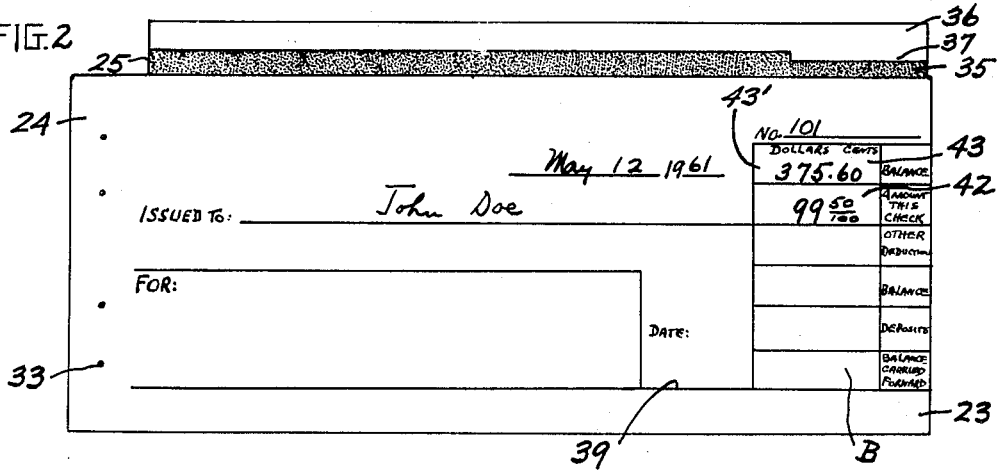
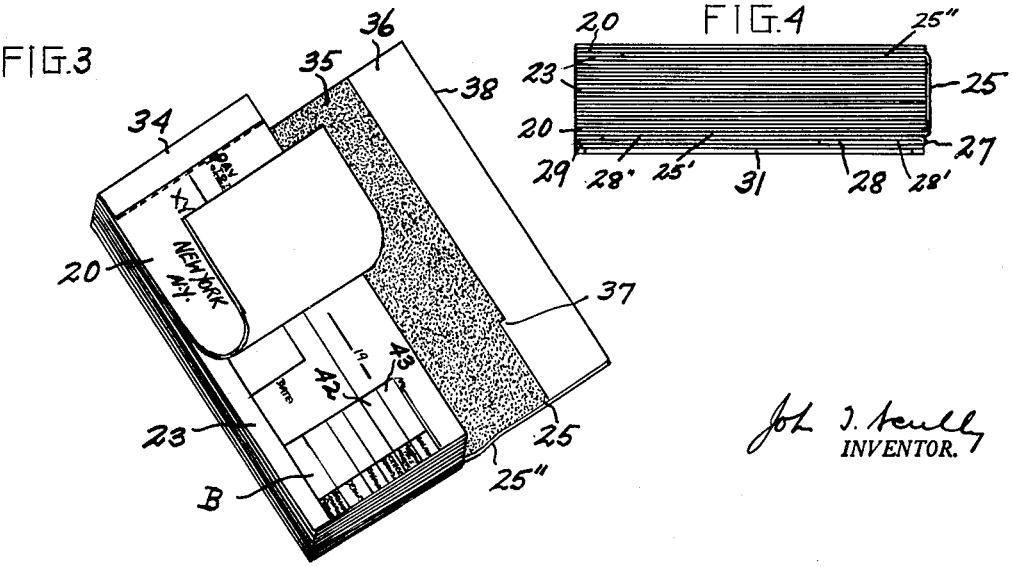
John J. Scully
INVENTOR.

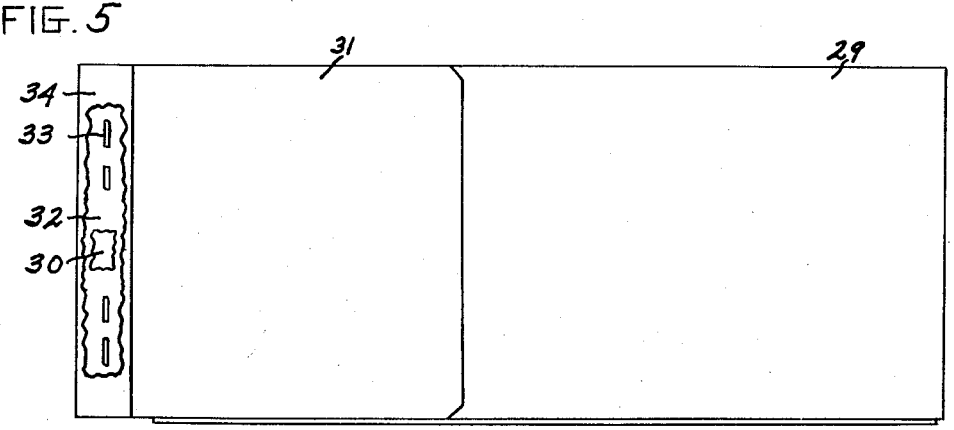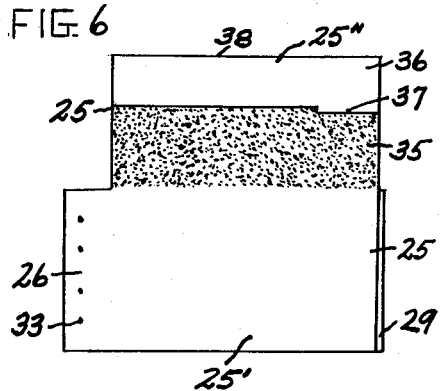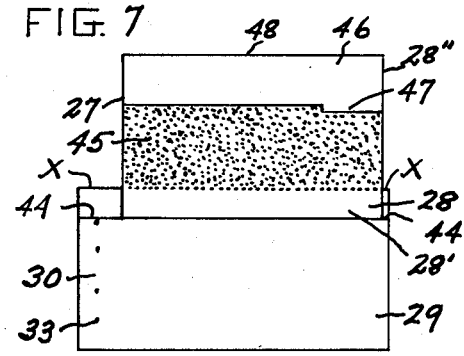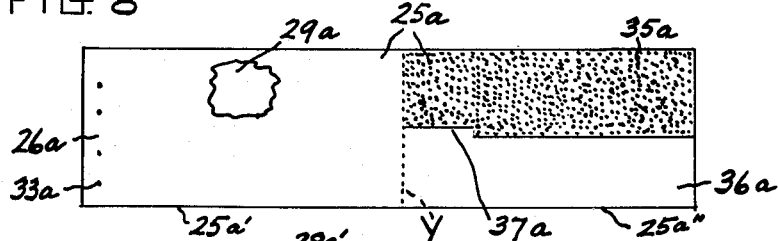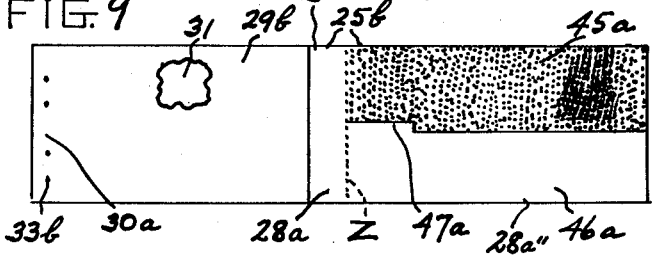

United States Patent Office 3,147,028
Patented Sept. 1, 1964

1

3,147,028
CHECK BOOKS
John T. Scully, 235 W. 76th St., New York, N.Y.
Filed Dec. 12, 1961, Ser. No. 160,401
7 Claims. (Cl. 282—23)

This invention relates to check books generally and more particularly to the type wherein matter written by the payor on a check may simultaneously be recorded on a stub or stub blank.

The recent great growth in the number of persons maintaining checking accounts at banks, especially accounts known as "special checking accounts" requiring maintenance of small minimum balances, has resulted in great numbers of visits or telephone calls to the banks to correct errors in the depositors' book-keeping in the check books. These visits and calls impose unnecessary hardship on the banks because of the great amount of time which bank personnel must give to them. It is an object of this invention to provide in a check book means to improve the facility for more accurate check book book-keeping. It is a further object to provide a generally improved check book. A still further object is the provision of a check book of the type described which is convenient to use and is economical to manufacture. A still further object is the provision in the check book stub of ample space for recording the purpose for which a check is issued or for arithmetical computations in computing a balance or for both.

Other objects will become apparent from the description taken in connection with the accompanying drawing, in which:

FIG. 1 is a front view of the check book showing a made-out check, a part being broken away to show fastener parts of a check blank and stub blank assembly; FIG. 2 is a front view with parts removed, parts in section and a part in changed position from that in FIG. 1 and showing a stub blank; FIG. 3 is a perspective view on a reduced scale of the check book; FIG. 4 is an outer end view of the check book turned on its axis clockwise from the position shown in FIG. 1, the thickness of the assembly being exaggerated to show parts and their relationship to each other; FIG. 5 is a rear view of the check book shown in FIG. 1 turned one hundred and eighty degrees on its axis and with parts broken away to show inner parts; FIG. 6 is a front view, on a reduced scale and with front parts removed, of a rear part with a part unfolded upwardly to show a fastened end and a manifolding area; FIG. 7 is a front view on the scale of FIG. 6 with parts shown in FIG. 6 removed to show an additional rear part unfolded upwardly to show a fastened part and a manifolding area; FIG. 8 is a front view, approximately on the scale of FIGS. 6 and 7 of a modification of a rear part, a part being broken away to show a further rear part, front parts removed to show the modification; FIG. 9 is a similar view on a similar scale as FIG. 8 showing a modification of another rear part.

Referring in more detail to the drawing and in which similar reference numerals or characters refer to similar or corresponding parts throughout the several views: The check book or check book filler shown in FIGS. 1–7 inclusive comprises an assembly of check blanks 20 having inner or tab ends 21, defined by the usual line

2 of perforations 22, a check stub blank 23 interposed between the check blanks directly at their rear and having inner or tab ends 24, and a manifolding sheet 25 also having an inner or tab end 26. A second or extra manifolding sheet 27 has a body or margin portion 28 glued to a final or rearmost sheet of paper 29 which sheet of paper has a tab or inner end 30. Behind sheet of paper 29, a card board or paper board tongue 31, to be inserted in a pocket of a check book cover or cover-folder to position and hold the check book in the cover or cover-folder in the well known manner, is positioned and provided with an inner or tab end 32. Staples 33 fasten the tab ends of the checks, check stub blanks, manifolding sheets, sheet 29 and tongue 31 together and hold the parts together in proper alignment and with the parts of the check blanks and the check stub blanks in proper relationship. A piece of binding material 34 is adhesively fastened over the inner or tab end of the assembly to cover the inner end edges of the blanks, sheets and tongue and to cover the staples at the front and rear. The manifolding sheet 25 comprises a body portion having a front face 25′ and a foldable body portion 25″, the latter being foldable towards the front face and over the top edge of whichever of the stub blanks is adjacently behind or at the rear of the check which is to be written upon, the checks and stub blanks being arranged in successive alternate positions whereby a check stub blank is adjacently at the rear of each check blank and the foldable body portion 25″ is adapted to be positioned between the check blank and the stub blank of the pair of such blanks to be written upon. The foldable body portion 25″ is provided with duplicating means in the form of a carbonized portion 35 and, preferably, with non-duplicating means in the form of an uncarbonized margin portion 36 extending, preferably, for the entire length of the portion 25″ and serves as a handling portion to be gripped by the user's fingers for manipulating the manifolding member into folded or unfolded position and thus avoid smudging the manifolding substance or the user's fingers. At the outer or right-hand marginal edge, the carbonized portion 35 of the manifolding member 25″ does not extend, as at 37 preferably, as far towards the bottom edge 38 of the member as the remaining inner portion to preferably prevent the appearance of matter in a certain portion of the stub blank which will be written on the check in a portion oppositely ahead of the certain portion of the stub blank, for example, the right hand marginal edge of the carbonized portion will, preferably, duplicate numerals substantially written only above a line defining the bottom of a space in which the amount of a check may be written in numerals in order that duplicated numerals will be in a proper position relative to other parts on a stub blank; on the other hand, the left hand portion of the carbonized portion will, preferably, duplicate on the stub blanks portions of consonants which may appear in the letters of the payee's name, which consonants may extend slightly below the line on the check blanks which defines the bottom of the payee space, the numeral and payee spaces being, preferably, in the same horizontal plane on the check blanks and the lines defining the bottoms of the spaces also, preferably, lying in the same horizontal plane. The longitudinal bottom edge 38 of the manifolding member is adapted to cooperate with a guide line 39, near the bottom, but spaced upwardly therefrom, of each of the stub blanks. The guide line 39 on the stub blanks is, preferably, approximately as long as the stub blanks from their tab, or inner, ends to their outer or right-hand ends. Preferably, the user will continue to fold the manifolding sheet so that the bottom edge 38 will always meet the line 39, or very closely meet the line, and thereby always control the distance towards the bottom of the stub blank which the manifolding substance or carbonized portion 35 will extend. Preferably, the foldable manifolding member or body portion 25" is narrow enough in width to be folded reasonably tautly just about to the line 39 of the first stub blank behind or at the rear of the first or initial check blank in the check book. As checks are made out and torn along the perforated line 22 thereon and removed from the check book, the corresponding stub blanks will be folded to the left and the thickness of the assembly remaining for use in the check book diminishes progressively, as is well known, but the guide lines 39 on the stub blanks will cooperate with the bottom edge 38 of the manifolding member 25" to indicate the desired position the carbonized portion 35 is to be in relation to check blank and stub blank from the first check blank and stub blank to the last check blank and stub blank in the check book.

The check blank 20 shown herein is of the general type used by special account depositors of several of the five or six largest banks in the United States. In addition to spaces for number and date of the checks, the check has a space 40 defined by the well known dollar-sign ($) to the left and in which space the amount for which the check is drawn is customarily written in numerals, precaution almost always being taken to place the first numeral close enough to the dollar-sign to prevent the placing of an additional numeral thereinbetween. To the left of the space 40, a relatively long space to receive the name of the payee is provided and usually defined on its left by some well known indicia such as "Pay to the order of." Below the line underlining the space for the payee's name is the usual space defined on the right by the word "Dollars" and in which space the amount for which the check is drawn is usually written in words for the amount in dollars, such as "Ninety nine" and in numerals in fraction, such as "50/100" for the amount in cents. In order to provide ample room to write in words a check for over one hundred dollars, for example—one hundred and eighty-nine and 50/100 dollars—or to provide for writing in large letters or any other suitable purpose, the space before "Dollars" is long enough to extend a distance far enough to the right to have its right or outer end disposed below the space defined by the dollar-sign. The word "Dollars" defining the right-hand end or outer end of the space 41 is also disposed below the space 40 and it will be observed (FIG. 1) that the fraction or numerals "50/100" has been written in close to the word "Dollars" and below space 40.

The stub blank 23, in each pair of check and stub blanks, has similar and similarly disposed spaces for number, date, name of payee and amount of the check written in numerals each disposed directly behind or at the rear of the corresponding spaces in the check so as to be in registration therewith. The space 42 in the stub blank is important in that it is directly behind the space 40 of the check, but extends a greater distance to the left relatively than does the space 40 and preferably extends further left than does the dollar-sign defining the left-hand end of space 40. Above space 42 on the stub blank is a space 43, preferably coextensive to the left with space 42 as shown, in which the depositor may write his balance against which the check is drawn. Spaces 42 and 43 may be in the form of smaller boxes in a relatively larger box B which may also contain below space 42 additional spaces, preferably coextensive to the left with spaces 42 and 43 as shown, for deductions, balances and deposits, for example as shown (FIGS. 2 and 3) and a relatively large space marked "For" in which may be written the purpose for which the check is issued and/or for arithmetic in determining amounts to be entered in box B below space 40.

As has been suggested in the United States Patents Numbers 2,310,394 and 2,831,707 issued respectively to L. B. Case and W. H. James, Jr., et al., a carbon sheet may be inserted between the check blank and the stub blank which will reproduce on the stub blank all the matter which the user writes on the check blank, if this be desired. It has also been suggested in Patent Number 1,368,518 issued to C. E. Mayne that a narrow manifolding strip completely carbonized be inserted between the layers of a two layer check or that the back of the front layer be carbonized in a limited longitudinal area to duplicate on the back layer only the name of the payee and the amounts written in both words and numerals for which the check is drawn; if desired, similar manifolding means may be employed in the present invention to reproduce or duplicate the preferred matter shown in this invention.

In its preferred form, the user will use the check book in the following manner: The foldable manifolding member 25" of the manifolding sheet 25 will be folded over the top edges of the check blanks and the stub blanks and inserted between the front or first check blank and the front or first stub blank with the edge 38 of member 25" positioned very closely approximately on and along the line 39 on the front face of the stub blank 23 and this will accurately position the carbonized portion 35 relatively to the check blank 20 and the stub blank 23. The user will then write on the check, in the designated places or spaces, the number of the check, the date of the check, the name of the payee, the amount of the check written in numerals after the dollar-sign, the amount of the check written in words in the space before "Dollars" (all as illustrated in FIG. 1), and, finally, his signature. All the matter written on the check except the amount of the check written in words and the fraction before "Dollars" and the payor's signature will simultaneously be recorded and appear in proper places on the stub blank (all as illustrated in FIG. 2). The amount in numerals, "99" written in space 40 of the check will appear as shown in space 42 of the stub blank, but there will be space to the left of "99" on the stub blank. Directly above the space 42, the space 43 will then be utilized to receive written therein the balance, against which the check is drawn. If the amount of the balance is 100 dollars or more requiring the entry of three or four numerals to indicate the dollar amount, the user will write in the balance, for example "375." dollars, in the space 43 as shown in FIG. 2 and wherein, it will be observed, the numeral "5" is directly above the second numeral "9" of space 42, the numeral "7" is directly above the first numeral "9" of space 42, and the numeral "3" is offset to the left of "99" of space 42 and directly above the empty space to the left of "99." Consequently, the amount for which the check is drawn in numerals may be prudently written close to the dollar-sign on the check, so close to the dollar-sign that no one or more of the numerical digits, 1, 2, 3, 4, 5, 6, 7, 8, 9, or 0 may be legibly written in between the dollar-sign and the amount "99," and be reproduced on the stub blank below a recording space and in a duplicating space extending to the left behind and preferably to the left beyond the dollar-sign on the check whereby the numerals of amounts shown in a column will be in proper relative positions for accurate subtraction of one amount from another on the stub blank. As will be observed in FIG. 2, adequate recording space is provided below duplicating space 42 in which to write the new balance before or after other deductions in addition to the amount of the check, such as bank service and account maintenance charges, and, preferably, this extra space is in the form of boxes of the relative shapes and sizes as shown below space 42 in large box B. If desired, box B may be longitudinally divided by a vertical line to separate a "Dollars" column from a "Cents" column. In the preferred form, as shown herein, the duplicating and recording spaces of the stub blanks may be designated or defined by the indicia of lines forming boxed-in spaces and also by the indicia of printed words, such as "Balance," "Amount this check," "Other deductions," "Deposits," and "Balance carried forward," adjoining the proper spaces.

Because of the fragility of thin paper and the amount of use to which it will be put in a check book numbering twenty or twenty-five check blanks and a similar number of stub blanks, I prefer to include, but not necessarily to include, the extra or second manifolding member or sheet 27 which (see FIG. 7) is provided for use as a substitute for manifolding sheet 25. Sheet 27 has a gummed body portion 28 secured adhesively to the upper marginal edge of the last or final page or sheet 29 of the check book with the edge of the body portion 28 extending along a line 44 provided on the front face of sheet 29 and parallel to the top edge of the sheet 29 or the check book represented by the line X— . . . —X. The foldable manifolding member 28" has a carbonized or manifolding portion 45 of similar size, shape and location relative to check blank and stub blank parts as previously described member 25, has a reduced area 47 similarly as at 37 in member 25 and has a bottom edge 48 of the handling portion 46 which will cooperate with line 39 on the stub blanks similarly as does edge 38 of member 25. As shown in FIG. 4, member 27 is positioned with its foldable portion or member 28" folded to lie on the front face 28' of body portion 28 and it will be observed that its folded width in this out of use position is approximately the same as the width of the check book, the top and bottom edges being substantially flush with the top and bottom edges of the check blanks and stub blanks. To save manufacturing costs, in some instances the member 27 may be provided with body portion 28 gummed but unattached adhesively to sheet 29 requiring the depositor to make the adhesive connection.

Referring specifically to FIG. 6 and to FIG. 4, it will be seen that body portion 25' of member 25 is substantially of the same width as the check blanks, the stub blanks and the final page 29 and that the foldable carbonized member 25" is laterally offset to the right of the tab portion 26 of member 25 (as well as similarly offset to the right of the tab ends of the check and stub blanks) and, consequently, with portion 25" folded down upon portion 25' all the members in the check book assembly except edge binder 34 can be conveniently and accurately guided for simultaneous stapling together of the parts.

Referring again to FIG. 2, I wish it to be understood that the indicia defining at the right the several boxes in box B and below box or space 42 may be suitably interchanged in position in the column if desired. It will also be understood that boxes indicating "Other deductions" and "Deposits," because of rare use of these boxes relative to stub blank (and check) use may be used by the depositor on only relatively few stub blanks and that in most instances the fourth box down from the top which is defined at its right end by the indicia "Balance" will be the mainly used space or box to show the balance remaining after the amount in box space 42 is subtracted from the amount in box space 43. Further, it will be observed that large box B extends sufficiently far to the left, preferably, to accommodate four numerals indicating "Dollars" as well as two numerals indicating "Cents," the space 43 having additional space 43' for one numeral before "375.", if necessary.

In the modification shown in FIG. 8, the manifolding member or sheet 25a differs from previously described manifolding sheet 25 in that it is elongated so that the foldable manifolding member 25a" is foldable over the outer end edges of the check blanks and stub blanks, for example the line Y indicating the bottom fold, so as to properly position the carbonized area 35a relatively to the blanks. The member 25a" will be folded to the left so as to position its top and bottom edges substantially flush with the top and bottom edges of the blanks, the outer end edge being positioned as close to the tab end of the stub blank as possible in all instances. In other respects sheet 25a is similar to and functions similarly to previously described sheet 25.

In the modification shown in FIG. 9, manifolding sheet 25b differs from sheet 27 in that a marginal end edge body portion 28a of sheet 25b is adhesively secured to the outer or right-hand marginal end edge of the final sheet or page 29b with its top and bottom edges aligned with the top and bottom edges of sheet 29b. Foldable manifolding member is foldable over the outer end edges of the check blanks and the stub blanks, for example the line Z indicating the bottom fold, so as to properly position the carbonized area 45a relatively to the blanks. The member 28a" will be folded to the left so as to position its top and bottom edges substantially flush with the top and bottom edges of the blanks, the outer end edge being positioned as close to the tab end of the stub blank in all instances as is possible. In other respects sheet 25b is similar to and functions similarly to sheet 27 previously described.

The single specific embodiment of the invention and the modifications shown and described herein are, it will be understood, for purposes of illustration, but not limitation. Other modifications are contemplated within the spirit and scope of the invention defined by the claims herein.

I claim:

1. A check book comprising a plurality of overlying check blanks and underlying stub blanks secured in an assembly in alternate arrangement therein, each check blank having a numeral space adapted to receive the amount of a check written in numerals, indicia on the check blanks opposite to and defining the left-hand ends of the numeral spaces, the stub blanks each positioned directly rearwardly of a check blank and having a duplicating space in registration with the numeral spaces of the check blanks and in which duplicating space numerals written on a check blank may be duplicated, the stub blanks each having also a recording space next above the duplicating space and in which recording space numerals may be written, the recording spaces extending laterally further to the left in the assembly relatively than said numeral spaces of the check blanks extend and each adapted to receive at least one of any of the numerical digits for disposition further to the left in the assembly relatively than the numeral spaces of the check blanks are adapted to receive, indicia on the stub blanks defining the extent to the left which said recording spaces extend, and duplicating means in the check book adapted for duplicating in the duplicating spaces of the stub blanks numerals written on the check blanks in said numeral spaces thereof.

2. A check book as claimed in claim 1 and with said duplicating spaces of the stub blanks laterally extending further to the left in the assembly relatively than said numeral spaces on the check blanks extend by a distance at least equal to the width of any one of the numerical digits which each of said recording spaces is adapted to receive for disposition further to the left in the assembly than the numeral spaces of the check blanks are adapted to receive, said duplicating spaces extending behind and in registration with said indicia on the check blanks opposite to and defining the left-hand ends of the numeral spaces on said check blanks, indicia on the stub blanks defining the extent to the left which said duplicating spaces extend, said stub blanks each having a lower recording space disposed below the duplicating spaces thereof and in which recording space numerals may be written, the lower recording spaces of the stub blanks laterally extending further to the left in the assembly relatively than said numeral spaces of the check blanks extend, said lower recording spaces each adapted to receive at least one of any one of the numerical digits for disposition further to the left in the assembly relatively than the numeral spaces of the check blanks are adapted to receive.

3. A check book comprising a plurality of overlying check blanks and underlying stub blanks secured in an assembly in alternate arrangement therein, the check blanks each having a relatively short upper numeral space disposed to the right and in which space the amount of a check may be written in numerals and having indicia opposite to and defining the left-hand ends of the numeral spaces, the check blanks each having a relatively longer payee space to the left of said indicia and in the same horizontal plane as said numeral spaces and having indicia defining the bottoms of said payee spaces, the payee spaces adapted to receive the names of the payees, the check blanks each having also a lower space disposed parallel to and next below said payee space and extending to the right beneath said upper numeral space, said lower space defined at its right-hand end by right end indicia and adapted to receive the amount of a check written in words and a numerical fraction with the fraction disposed beneath said upper numeral space and adjacent said right end indicia, the stub blanks each having a numeral duplicating space behind and in registration with the upper numeral spaces of the check blanks and having a payee duplicating space behind and in registration with the payee spaces of the check blanks, the stub blanks each having also a recording space next below said duplicating spaces and substantially directly behind said right end indicia and the right-hand ends of said lower spaces of the check blanks, and duplicating means in the check book adapted to duplicate matter written on an overlying check blank onto an underlying stub blank and including left and right duplicating portions spaced upwardly of the bottoms of the stub blanks with the left duplicating portion disposed behind the payee space of a check blank to duplicate on the underlying stub blank matter written in the payee space of the check blank and with the right duplicating portion disposed behind the numeral space of the check blank to duplicate on a stub blank matter written in the numeral space of a check blank, the left duplicating portion extending downwardly relatively further in the direction of the bottom of a stub blank than the right duplicating portion extends whereby the left duplicating portion is adapted to extend slightly below the payee space of a check blank to duplicate on a stub blank parts of letters of the alphabet written below the payee space, as the name of the payee is written on the check blank, while, simultaneously, the right duplicating portion is adapted to extend relatively closer to the bottom of the numeral space of a check blank than the left duplicating portion is adapted to extend relatively to the bottom of the payee space of the check blank to substantially confine the duplication of matter written in the numeral space of a check blank to the numeral duplicating space and above the recording space next below on a stub blank.

4. A check book as claimed in claim 3 and with said duplicating means disposed on a foldable manifolding sheet secured in the check book rearwardly of a plurality of said check blanks and said stub blanks and having a foldable portion foldable over an edge of the stub blanks and having a generally horizontal free edge and carrying said left and said right duplicating portions, said foldable portion having next adjacent said duplicating portions a non-duplicating marginal edge handling portion disposed vertically between the duplicating means and said free edge whereby said handling portion comprises the bottom marginal edge of the foldable portion with the latter in duplicating position.

5. A check book comprising a plurality of overlying check blanks and underlying stub blanks secured in an assembly in alternate arrangement therein, each check blank having a numeral space adapted to receive the amount of a check written in numerals, indicia on the check blanks opposite to and defining the left hand ends of the numeral spaces, the stub blanks each positioned directly rearwardly of a check blank and having a duplicating space in registration with the numeral spaces of the check blanks and in which duplicating space numerals written on a check blank may be duplicated, the stub blanks each having also a recording space next above the duplicating space and in which recording space numerals may be written, the recording spaces extending further to the left in the assembly relatively than said numeral spaces of the check blanks extend and each recording space adapted to receive at least one of any of the numerical digits for disposition further to the left in the assembly than the numeral spaces of the check blanks are adapted to receive, the duplicating spaces extending further to the left in the assembly relatively than the numeral spaces of the check blanks extend by a distance at least equal to the width of any one of the numerical digits which each of said recording spaces is adapted to receive for disposition further to the left in the assembly than the numeral spaces of the check blanks are adapted to receive, said duplicating spaces extending behind and in registration with said indicia on the check blanks opposite to and defining the left-hand ends of the numeral spaces on said check blanks, indicia on the stub blanks defining the extent to the left which said duplicating spaces extend, and duplicating means in the check book adapted for duplicating in the duplicating spaces of the stub blanks numerals written on the check blanks in said numeral spaces thereof.

6. A check book comprising a plurality of overlying check blanks and underlying stub blanks secured in an assembly in alternate arrangement therein, the check blanks each having a designated payee space for the name of the payee and a designated numeral space for the amount of a check written in numerals, the check blanks each having also a designated lower space disposed below the payee space and in which lower space the amount of a check may be written in words, the check blanks each having also a signature space disposed below said lower space and defined at its bottom by indicia, the stub blanks each disposed rearwardly opposite said payee, said numeral and said signature spaces of each check blank, and a duplicating sheet in the check book for insertion and removal between the uppermost check blank and underlying stub blank for duplicating on the stub blank matter written in the payee and numeral spaces of the check blank, the duplicating sheet having duplicating means on one side and having a horizontally extending marginal edge handling portion free on opposite sides of duplicating means, said portion free of duplicating means adapted, with the sheet in duplicating position, to be disposed below said duplicating means and rearwardly opposite the signature space of said uppermost check blank and oppositely ahead of the underlying stub blank.

7. A check book comprising a plurality of overlying check blanks and underlying stub blanks in an assembly in alternate arrangement therein, the check blanks each having a designated payee space for the name of the payee, a designated numeral space for the amount of the check in numerals and a designated signature space, the stub blanks each having a space for duplication of the name of the payee in registration with the payee spaces of the check blanks, the stub blanks each having on their right-hand end a vertical column of designated spaces including recording spaces and a duplicating space, the duplicating space of said column being in registration with the numeral space of an overlying check blank, the signature spaces of the check blanks being in registration with the vertical columns of designated spaces, means in the check book for duplicating on the stub blanks matter written in the payee spaces of the check blanks and for duplicating in the vertical columns of designated spaces matter written on the check blanks in said numeral spaces thereof, and a non-duplicating member in the check book for insertion and removal between the check blanks and the stub blanks and adapted to lie between an overlying check blank and an underlying stub blank and rearwardly opposite the signature space of the check blank and oppositely ahead of the vertical column of designated spaces on the underlying stub blank.

References Cited in the file of this patent

UNITED STATES PATENTS

| | | |
|---|---|---|
| 1,285,184 | Hollister | Nov. 19, 1918 |
| 1,552,879 | Randolph | Sept. 8, 1925 |
| 1,636,441 | Rotsted | July 19, 1927 |
| 2,310,494 | Case | Feb. 9, 1943 |
| 2,585,179 | Silver | Feb. 12, 1952 |
| 2,678,223 | Shepherd | May 11, 1954 |
| 2,831,707 | James et al. | Apr. 22, 1958 |
| 3,058,758 | Govatsos | Oct. 16, 1962 |

FOREIGN PATENTS

| | | |
|---|---|---|
| 451,605 | Great Britain | Feb. 10, 1936 |